(12) United States Patent
Luo et al.

(10) Patent No.: US 9,094,239 B1
(45) Date of Patent: Jul. 28, 2015

(54) APPARATUS AND METHOD FOR POLARITY TAP CONTROL

(71) Applicant: Altera Corporation, San Jose, CA (US)

(72) Inventors: Mei Luo, San Jose, CA (US); Thungoc M. Tran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 99 days.

(21) Appl. No.: 13/632,263

(22) Filed: Oct. 1, 2012

(51) Int. Cl.
*H03K 5/159* (2006.01)
*H04L 27/01* (2006.01)

(52) U.S. Cl.
CPC ........................................ *H04L 27/01* (2013.01)

(58) Field of Classification Search
CPC .............. H04L 25/03057; H04L 27/01; H04L 2025/0349
USPC ................... 375/229, 233; 708/300, 322, 323
See application file for complete search history.

(56) References Cited

U.S. PATENT DOCUMENTS

| | | | |
|---|---|---|---|
| 7,697,603 B1 * | 4/2010 | Wang et al. | 375/233 |
| 7,782,935 B1 * | 8/2010 | Wong et al. | 375/233 |
| 2010/0202506 A1 * | 8/2010 | Bulzacchelli et al. | 375/233 |

* cited by examiner

*Primary Examiner* — Betsy Deppe
(74) *Attorney, Agent, or Firm* — Guadalupe M. Garcia (57) ABSTRACT

Among other things, the present invention addresses timing issues related to a polarity control scheme in DFE implementation. Multiplexing that may be necessary for implementing a polarity control scheme is incorporated into multiplexing that may be required to convert half rate data into full rate data in a delay element of a DFE. Clocking signals are provided to a multiplexer that are encoded with polarity information. The various clock signals are generated using a clock generation circuit that incorporates polarity control.

22 Claims, 8 Drawing Sheets

APPARATUS AND METHOD FOR POLARITY TAP CONTROL

FIELD OF THE INVENTION

The present invention generally relates to the field of digital communications. More particularly, the present invention relates to decision feedback equalization as implemented in digital communications.

BACKGROUND OF THE INVENTION

Decision Feedback Equalization (DFE) is based on the principle that once the value of the current transmitted symbol has been determined, the contribution of intersymbol interference (ISI) to future received symbols can be removed. DFE has a nonlinear feature that is due to a decision device that attempts to determine which symbol of a set of discrete levels was actually transmitted. Once the current symbol has been decided, a filter structure calculates the ISI effect it would tend to have on subsequent received symbols and, thereafter, compensate the input to the decision device for subsequent samples. This post-cursor ISI removal is accomplished by the use of, among other things, a feedback filter structure.

Such a feedback filter structure can include a multiple tap digital filter for cancelling, for example, post-cursor ISI and transmission channel discontinuity. In typical implementations, the second or higher taps of a multiple tap implementation have negative or positive feedback depending on transmission channel characteristics. In certain implementations the second taps and above of a DFE have independent programmable polarity control. For example, polarity control can be implemented to select either DFE delayed data or inverted delayed data by implementing a 2-to-1 multiplexer in the critical path. Such implementations, however, can introduce challenges when attempting to meet the needs of higher speed circuits. For example, feedback loop timing can be difficult to meet. The delays introduced by the multiplexer, for example, can make it difficult to meet system requirements.

There exists a need in the art for a DFE with reduced loop timing. There is a further need in the art for DFE implementations with reduced hardware complexity that still meet operational and timing requirements.

SUMMARY OF THE INVENTION

Among other things, an embodiment of the present invention addresses timing issues related to a polarity control scheme in DFE implementation. More particularly, in an embodiment of the present invention, multiplexing that may be necessary for implementing a polarity control scheme is incorporated into multiplexing that may be required to convert half rate data into full rate data in a delay element of a DFE. In this way, at least one stage of multiplexing and its associated propagation delays is eliminated.

In an embodiment of the present invention, clocking signals are provided to a multiplexer that are encoded with polarity information. In an embodiment of the present invention, the various clock signals are generated using a clock generation circuit that incorporates polarity control. Importantly, a polarity control generation circuit according to an embodiment of the present invention does not introduce any additional loop delays in a DFE implementation. An embodiment of the present invention is implemented in an FPGA operating at 28 gigabits per second.

A further feature of an embodiment of the present invention is that the polarity selection for a given stage in a DFE circuit does not affect the polarity of the following taps. Also, embodiments of the present invention introduce no further power consumption than prior art implementations.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

DETAILED DESCRIPTION OF THE INVENTION

The following description is of certain preferred embodiments presently contemplated for carrying out this invention. This description is made for the purpose of illustrating the general principles of this invention and is not meant to limit the inventive concepts claimed herein.

The operation of a DFE can be generally understood as follows. Assuming that a channel is linear time-invariant (LTI), intersymbol interference (ISI) can be described as a deterministic superposition of time-shifted smeared pulses. Advantageously, the DFE uses information about previously received bits to cancel out their ISI contributions from the current decision. In general, a DFE is implemented to remove post-cursor ISI, e.g., the ISI introduced from past bits.

Figure 1:
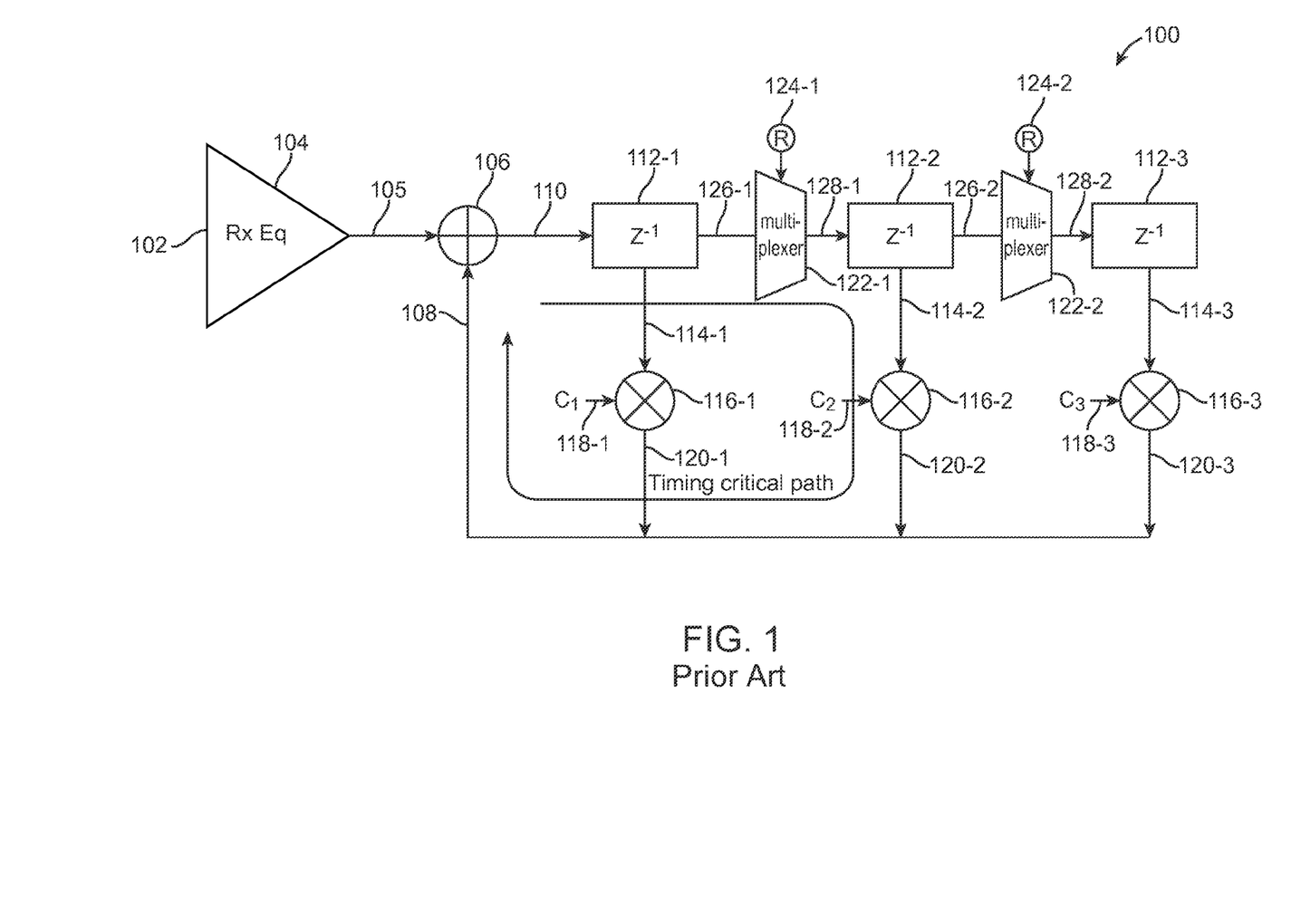
FIG. 1 is a block diagram of a typical DFE circuit.

Shown in FIG. 1 is a block diagram of an implementation of DFE 100 according to a typical implementation. As shown, received signal, R, 102 is amplified and conditioned by amplifier 104. Amplifier 104 outputs conditioned signal Rx 105 that is provided to summing node 106. Summing node 106 also receives feedback signal 108 that will be further understood upon further understanding of DFE 100. The output of summing node, error signal 110, is provided to delay element 112-1. Delay elements 112-2 and 112-3 are substantially similar to delay element 112-1. An implementation with three delay elements will be used for the present description but those of ordinary skill in the art will understand the manner in which many more delay elements can be implemented.

As shown in FIG. 1, delay element 112-1 provides signal 114-1 that is provided to mixer 116-1. Further provided to mixer 116-1 is signal $C_1$ 118-1. Responsively, mixer output signal 120-1 is provided to feed back signal 108. Signals 114-2 and 114-3 are generated substantially similarly to signal 114-1. Mixers 116-2 and 116-3 are substantially similar to mixer 116-1. Signals $C_2$ 118-2 and $C_3$ 118-3 are substantially similar to signal $C_1$ 118-1. Mixer output signals 120-2 and 120-3 are substantially similar to mixer output signal 120-1.

Output 126-1 of delay element 112-1 is provided to the input of multiplexer 122-1 that also receives polarity signal 124-1. Polarity signal 124-1 alternately determines whether or not an inverted signal of output 126-1 is to be provided at multiplexer output 128-1. For example, in an implementation a logic low level input at polarity signal 124-1 indicates that multiplexer 122-1 provides a non-inverted signal at output 128-1, and a logic high input at polarity signal 124-1 indicates that multiplexer 122-1 provides an inverted signal at output 128-1. Multiplexer 122-2 operates substantially similarly to multiplexer 122-1.

Through multiplexers 122-1 and 122-2, DFE 100 is able to implement an inverted signal or not. Unfortunately, such an implementation introduces a delay into the operation of DFE 100. Such a delay can be better understood by understanding a typical circuit implementation of the delay elements and multiplexers.

Figure 2:
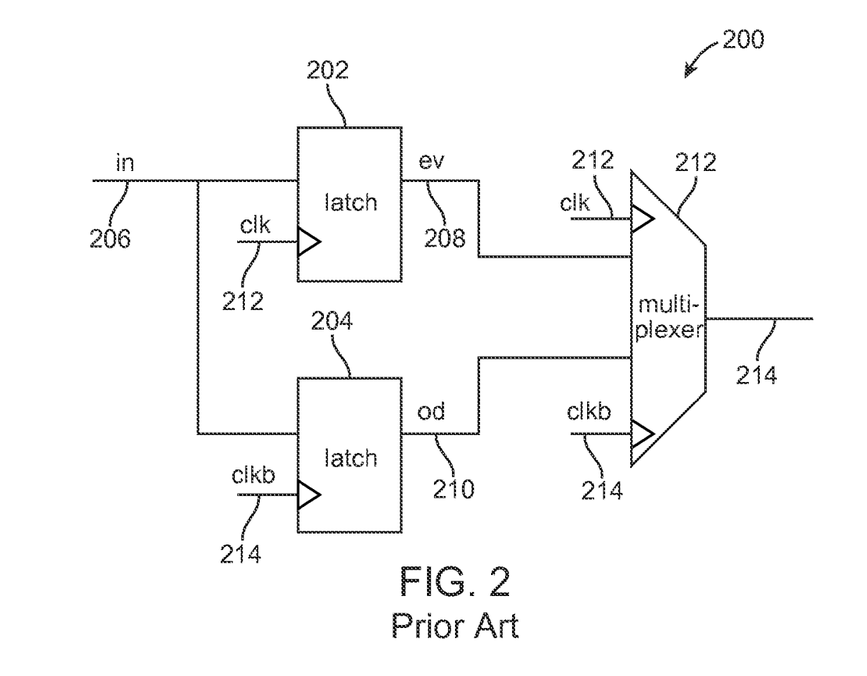
FIG. 2 is a block diagram of a typical delay element as implemented in a DFE circuit.

For example, shown in FIG. 2 is a typical implementation for delay element 200. In a typical implementation, delay element includes latches 202 and 204 that demultiplex input signal 206 into half rate data that includes even signal 208 and odd signal 210. Latches 202 and 204 are respectively triggered by clock signals clk 212 and clkb 214. Multiplexer 212 is provided within delay element 200 so as to merge even signal 208 and odd signal 210 back into full rate data signal 214 that is the output of delay element 200.

Figure 3:
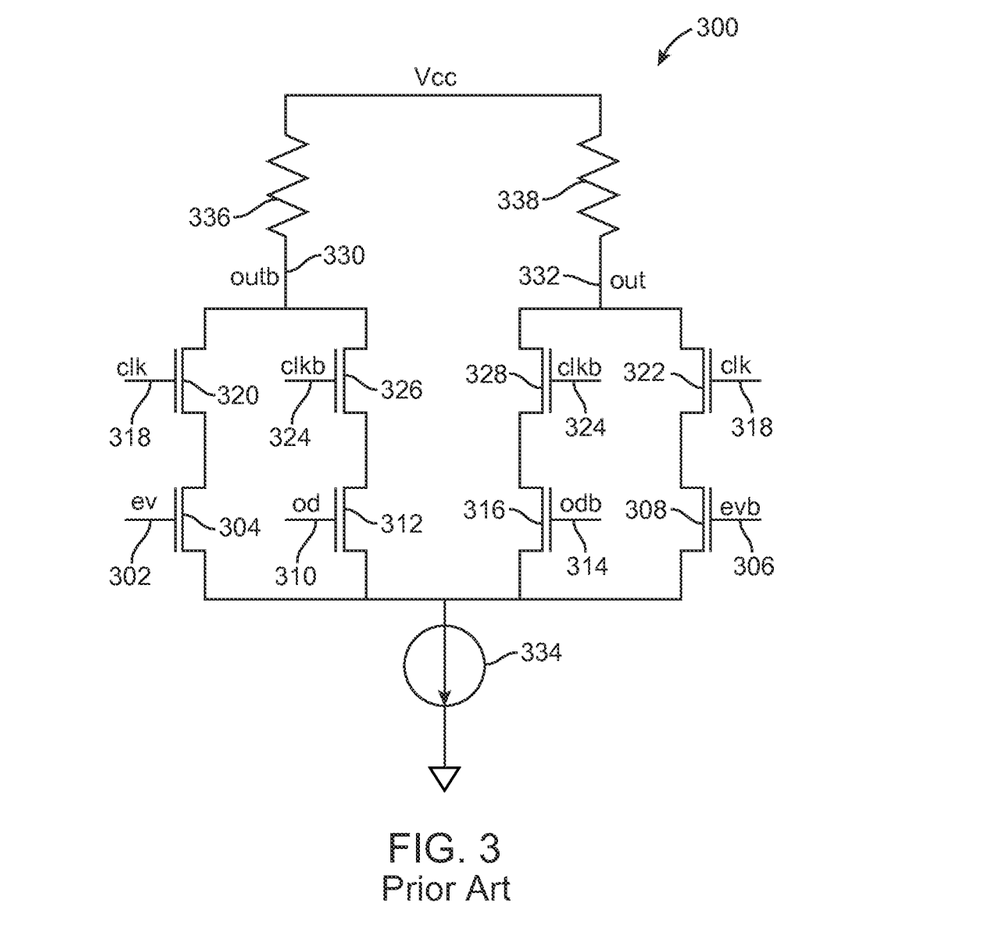
FIG. 3 is a schematic diagram of a typical multiplexer as implemented in a delay element.

Details of a typical implementation of multiplexer 300 that can be used, for example as multiplexer 212, are shown in FIG. 3. As shown, even signal 302 is provided to the gate of transistor 304 and evenb signal 306 (the complement of even signal 302) is provided to the gate of transistor 308. Also, odd signal 310 is provided to the gate of transistor 312 and oddb signal 314 (the complement of odd signal 310) is provided to the gate of transistor 316. Clk signal 318 is provided to the gate of transistor 320 and the gate of transistor 322 while clkb signal 324 (the complement of clk signal 318) is provided to the gate of transistors 326 and 328. Through the further operation of resistors 336 and 338 and current source 334, multiplexer 300 provides differentially serialized even signal 302/odd signal 310 by the out of phase clock signals clk signal 318 and clkb signal 324 to provide a full rate data signal as out signal 332 and outb signal 330. In this way, a slicer of a DFE implementation that implements a clocked multiplexer such as multiplexer 300 merges half rate data back to full rate data.

Recall that, as shown in FIG. 1, a typical DFE implementation further includes another multiplexer (e.g., multiplexer 122-1) so as to polarity control (e.g., control of whether an inverted signal is to be used). It can, therefore, be appreciated that the multiplexer associated with delay element 112-1, for example, provides a propagation delay through its associated circuitry. It can further be appreciated that polarity selection multiplexer such as multiplexer 122-1 provides a further delay through its associated circuitry. Whereas in slowly operating circuitry, such delays may be negligible, as circuitry is made to perform at faster operating frequencies, the delays associated with propagating through two sets of multiplexer circuits provides design challenges. For example, whereas an implementation of FIG. 1 that operates within an FPGA operating at 12.5 gigabits per second may operate within design specifications, such an implementation may not be appropriate for an FPGA operating at 28 gigabits per second. More particularly, the polarity selection multiplexer such as multiplexer 122-1 may add a propagation delay of approximately 30 picoseconds that inhibits meeting loop timing specifications.

Among other things, an embodiment of the present invention addresses timing issues related to a polarity control scheme. More particularly, in an embodiment, multiplexing that may be necessary for implementing a polarity control scheme is incorporated into the multiplexer that is required to convert half rate data into full rate data.

Figure 4:
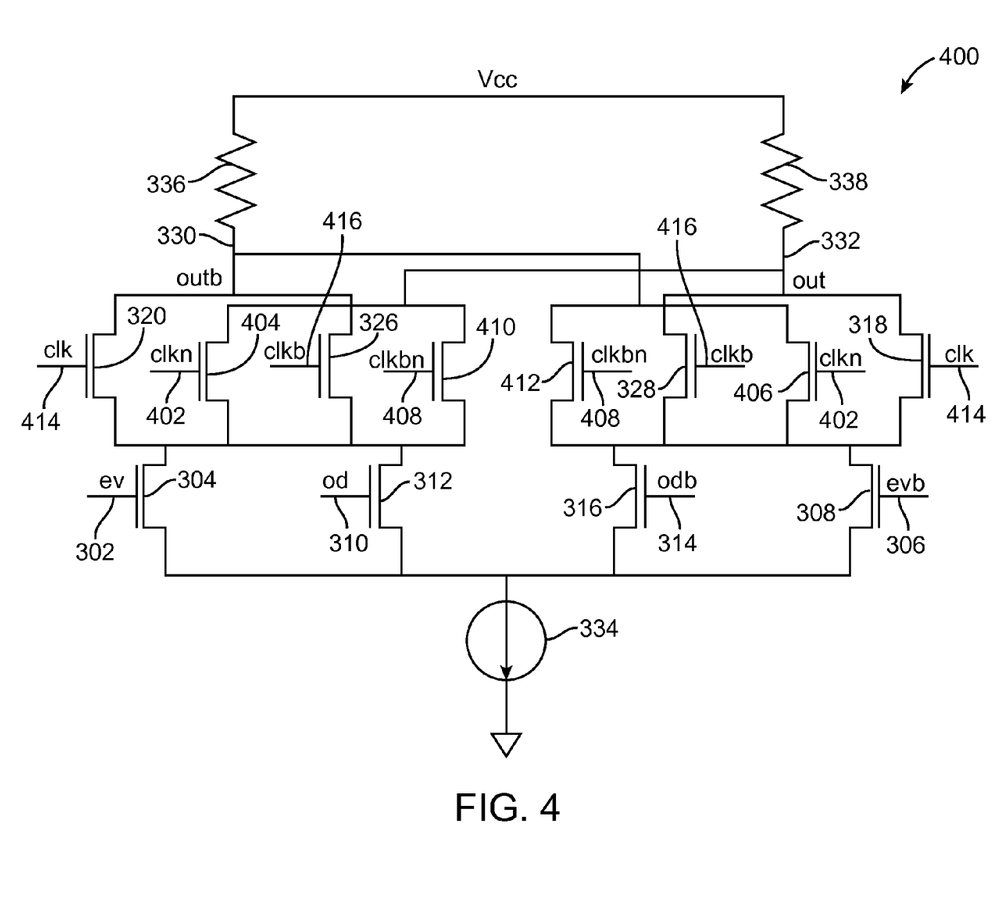
FIG. 4 is a schematic diagram of a multiplexer according to an embodiment of the present invention.

FIG. 4 provides a schematic according to an embodiment of the present invention that incorporates a polarity control scheme into a multiplexer of a delay element that is appropriate for use in a DFE implementation. The embodiment of FIG. 4 includes certain features of multiplexer 300 of FIG. 3 as indicated by the like-numbered circuit elements. Multiplexer 400, according to an embodiment of the present invention, includes as input clkn signal 402 that is provided to the gate of transistor 404 and the gate of transistor 406. Clkbn signal 408 is provided to the gate of transistor 410 and the gate of transistor 412. Multiplexer 400 further includes as input clk signal 414 that is provided to the gate of transistor 320 and the gate of transistor 318 as well as clkb signal 416 that is provided to the gate of transistor 326 and the gate of transistor 328. In an embodiment of the present invention, clkn signal 402, clkbn signal 408, clk signal 414, and clkb signal 416 are clocking signals that are encoded with polarity information.

Figure 5:
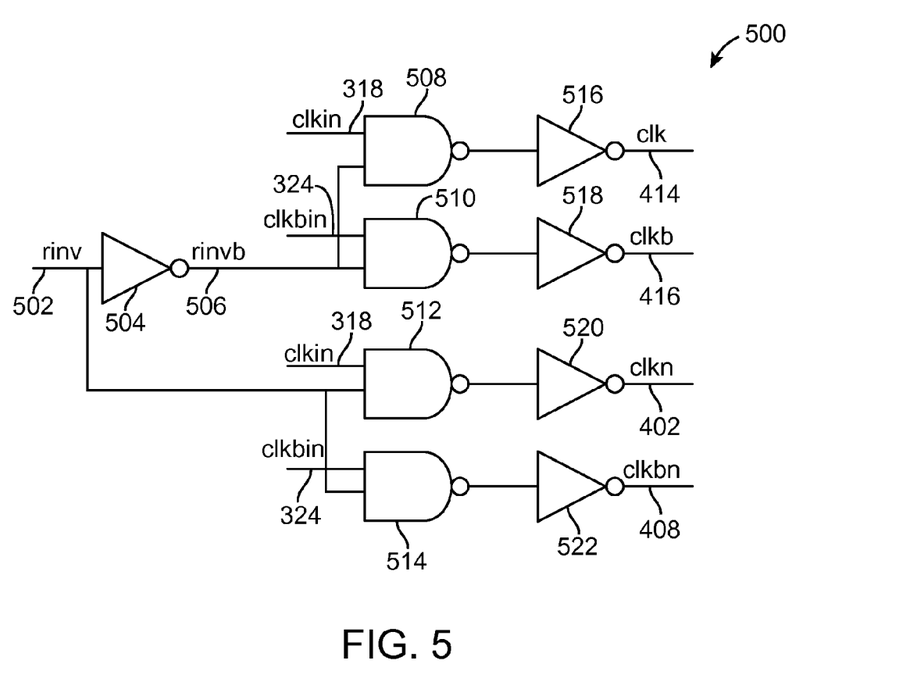
FIG. 5 is a logic diagram of a polarity encoding circuit according to an embodiment of the present invention.

In an embodiment of the present invention, the various clock signals of FIG. 4 including clkn signal 402, clkbn signal 408, clk signal 414, and clkb signal 416 are generated using a clock generation circuit 500 that incorporates polarity control as shown in FIG. 5. Importantly, polarity control generation circuit does not introduce any loop delays in a DFE implementation. In an embodiment, polarity control clock generation circuit 500 receives rinv signal 502 that is an indication of the desired polarity to be used in a DFE implementation according to the teachings of the present invention. Rinv signal 502 is provided to inverter 504 so that both rinv signal 502 and its complement rinvb signal 506 are available to polarity control clock generation circuit 500. As shown in FIG. 5, clkin signal 318 and rinvb signal 506 are provided to NAND gate 508 that, after passing through inverter 516, provides clk signal 414. In this way, clk signal 414 is a polarity encoded signal associated with clkin signal 318 and rinvb signal 506. In analogous manners, clkb signal 416 is a polarity encoded signal associated with clkbin signal 324 and rinvb signal 506 that are generated through the use of NAND gate 510 and inverter 518; clkn signal 402 is a polarity encoded signal associated with clkin signal 318 and rinv signal 502 that are generated through the use of NAND gate 512 and inverter 520; and clkbn signal 408 is a polarity encoded signal associated with clkbin signal 324 and rinv signal 502 that are generated through the use of NAND gate 514 and inverter 522.

With regard to the embodiment of the present invention as shown in FIG. 4, it can therefore be appreciated that both the multiplexing associated with traditional delay elements (e.g., delay element 112-1) and polarity control associated with, for example, multiplexer 122-1 are incorporated into multiplexer 400 according to an embodiment of the present invention. For example, with reference to FIGS. 4 and 5, when rinv signal 502 is set to logic 0, clk signal 414 and clkb signal 416 toggle and clkn signal 402 and clkbn signal 408 are at logic 0. Out signal 330 in this situation is even signal 302 and odd signal 310, and outb signal 338 is evenb signal 306 and oddb signal 314. When rinv signal 502 is set to logic 1, clk signal 414 and clkb signal 416 are logic 0 and clkn signal 402 and clkbn signal 408 toggle. Out signal 330 in this situation is evenb signal 306 and oddb signal 314, and outb signal 338 is even signal 302 and odd signal 310.

Figure 6:
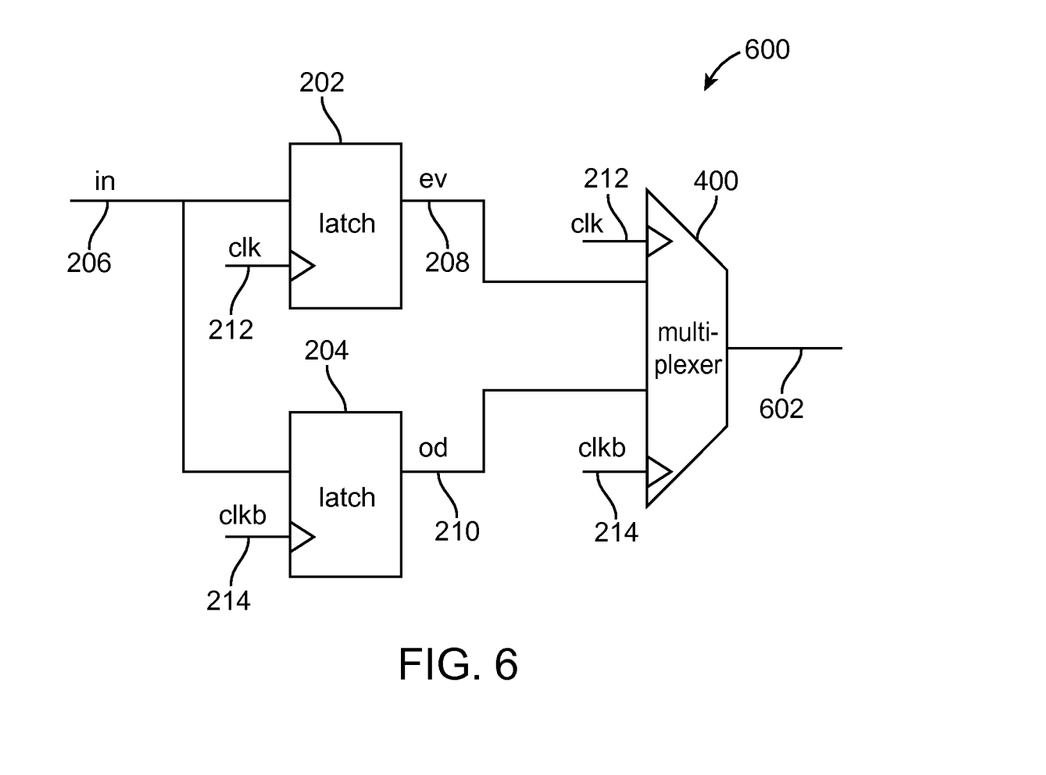
FIG. 6 is a block diagram of a delay element according to an embodiment of the present invention.

In an embodiment of the present invention, multiplexer 400 is further implemented into delay element 600 as shown in FIG. 6 (note: not all signals of multiplexer 400 are shown).

According to an embodiment, delay element 600 provides both a full data rate output 602 while incorporating polarity control and eliminating delays associated with prior art polarity control schemes. In an embodiment of the present invention, delay element 600 is further implemented into DFE circuit 700 as shown in FIG. 7.

Figure 7:
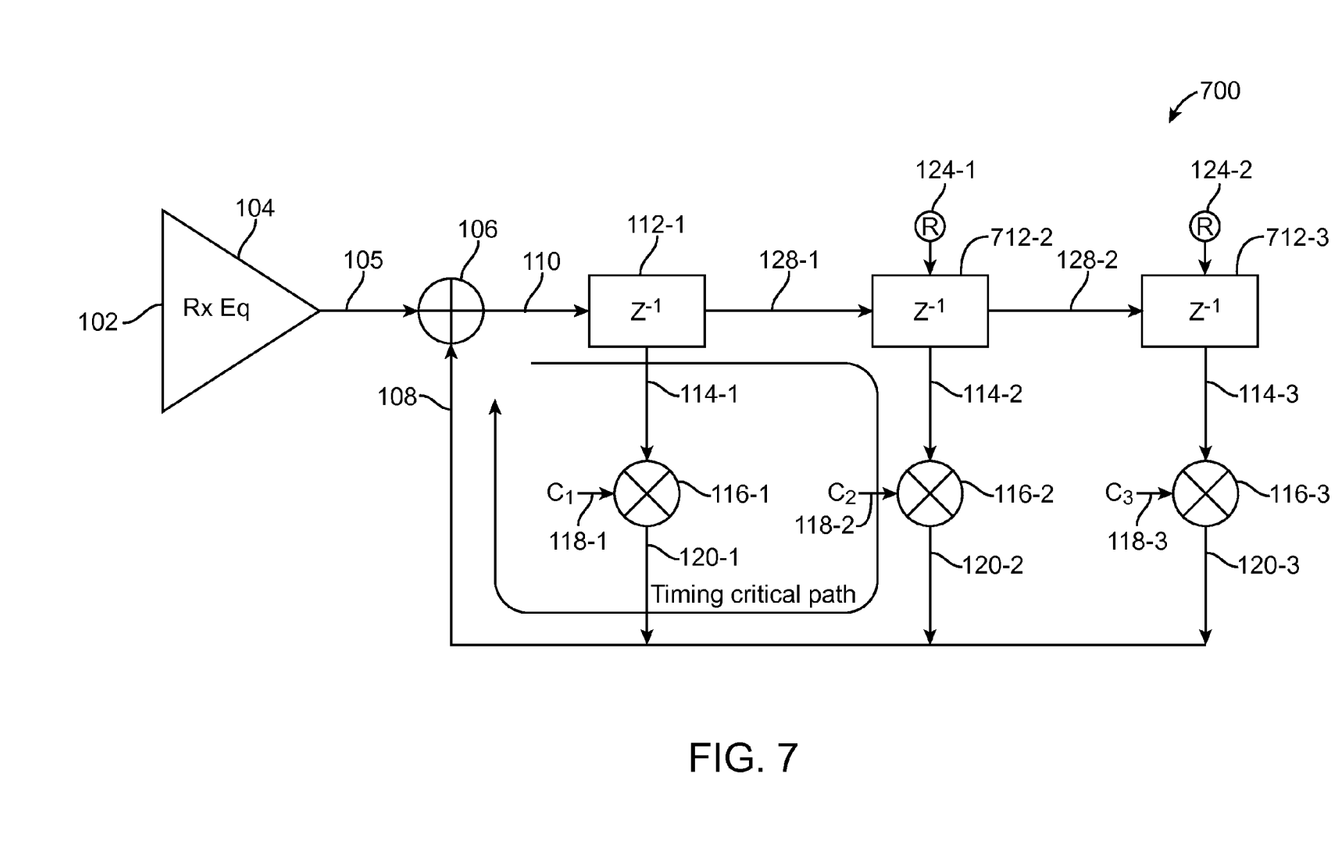
FIG. 7 is a block diagram of a DFE circuit according to an embodiment of the present invention.

As shown in FIG. 7, DFE circuit 700 has similarities to DFE circuit 100 shown in FIG. 1. Importantly, however, DFE circuit 700 implements delay elements 712-2 and 712-3 that incorporate polarity control while eliminating a substantial amount of propagation delay associated with DFE circuit 100 of FIG. 1. An embodiment of the present invention is implemented in an FPGA operating at 28 gigabits per second that is configured to operating using current mode logic (CML). Because of the improved timing characteristics, loop delay specifications are able to be met in such an embodiment.

It is important to note that because delay element 112-1 as shown in FIG. 7 does not incorporate polarity control, delay element 600 according to an embodiment of the present invention need not be implemented therein. In another embodiment of the present invention, however, delay element 600 can be implemented in the first stage delay element while holding its polarity control signal (e.g., rinv signal 502 of FIG. 5) at a fixed logic level. Such an implementation can reduce design complexity while not incorporating many further circuit elements. Indeed, a full real-world implementations of the present invention can significantly reduce transistor counts (even if implemented in the first stage delay element) because of the elimination of the prior art multiplexer associated with polarity control. A further feature of an embodiment of the present invention is that the polarity selection for a given stage in a DFE circuit does not affect the polarity of the following taps. Also, embodiments of the present invention introduce no further power consumption than prior art implementations.

Figure 8:
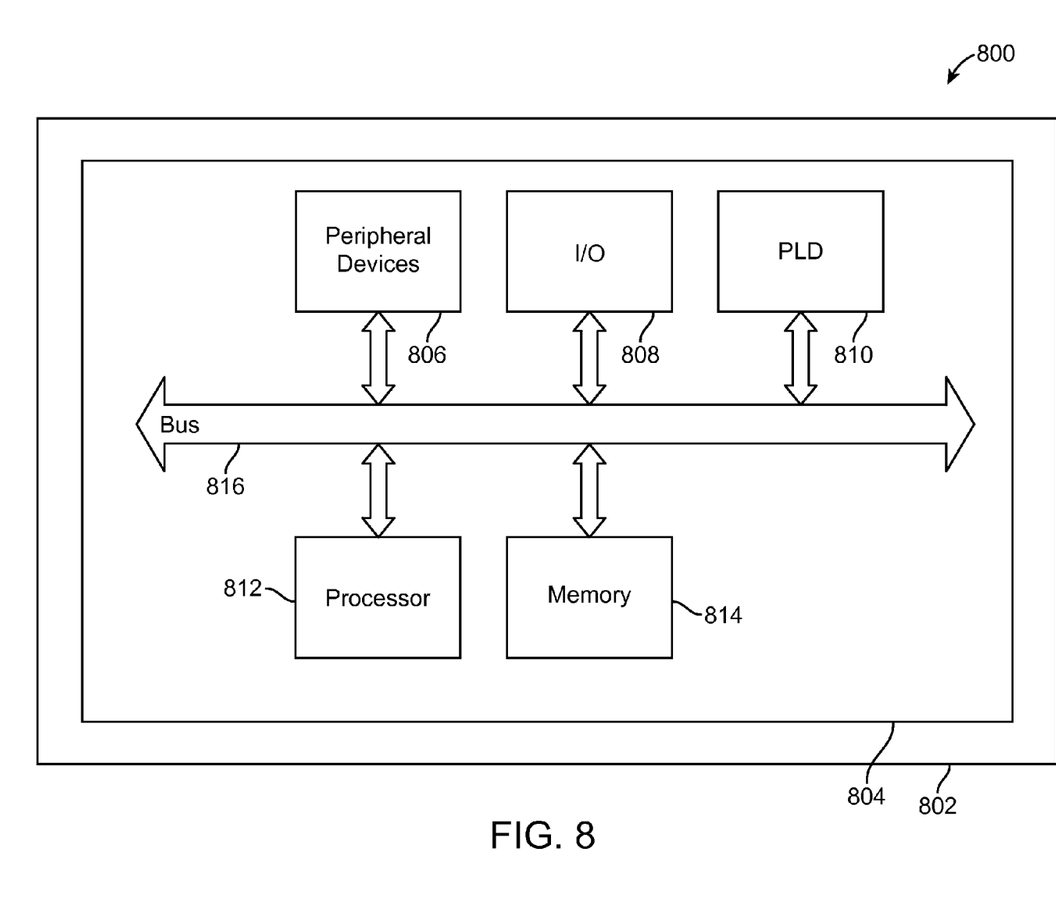
FIG. 8 is a simplified block diagram of an illustrative system employing a programmable logic device incorporating embodiments of the present invention.

An embodiment of the present invention is intended for implementation in a programmable logic device that can be implemented in a data processing system 800 such as shown in FIG. 8. Data processing system 800 may include one or more of the following components: processor 812; memory 814; I/O circuitry 808; and peripheral devices 806. These components are coupled together by system bus 816 and can be populated on circuit board 804 which is contained in end-user system 802.

System 800 can be used in a wide variety of applications, such as computer networking, data networking, instrumentation, video processing, digital signal processing, or any other application where the advantage of using programmable or reprogrammable logic is desirable. PLD 810 can be used to perform a variety of different logic functions. For example, PLD 810 can be configured as a processor or controller that works in cooperation with processor 812. PLD 810 may also be used as an arbiter for arbitrating access to a shared resource in system 800. In yet another example, PLD 810 can be configured as an interface between processor 812 and one of the other components in system 800. It should be noted that system 800 is only exemplary, and that the true scope and spirit of the invention should be indicated by the following claims.

Various technologies can be used to implement PLDs 810 as described above and incorporating this invention. And although the invention has been described in the context of PLDs, it may be used with any programmable integrated circuit device.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

In describing the present invention, it has been shown that embodiments of the present invention track in a desirable way the reference signal common mode with the DFE summing node common mode. It has been observed that the amplitude of the differential signal is not changed. Also, because of the matched RC characteristics, no undesirable glitches were observed in the reference differential signal level when its common changes.

It should be appreciated by those skilled in the art that the specific embodiments disclosed above may be readily utilized as a basis for modifying or designing other write elements. It should also be appreciated by those skilled in the art that such modifications do not depart from the scope of the invention as set forth in the appended claims.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A decision feedback equalization circuit, comprising:
   a summing node configured to receive a first signal and a feedback signal and further configured to generate a first output signal; and
   a plurality of delay elements configured to contribute to the feedback signal, wherein a first set of the plurality of delay elements receives at least one polarity encoded clocking signal encoded with information about whether or not the plurality of delay elements use inverted input data.

2. The circuit of claim 1, wherein each of the plurality of delay elements is configured to receive a respective delayed version of the first output signal.

3. The circuit of claim 1, wherein each of the plurality of delay elements is configured to receive a respective delayed version of the first output signal and further configured to generate an inverted version of the respective delayed version of the first output signal.

4. The circuit of claim 1, wherein the plurality of delay elements is implemented in current mode logic.

5. The circuit of claim 1, wherein the at least one polarity encoded clocking signal is configured to be responsive to a polarity control signal.

6. The circuit of claim 1, wherein each of the plurality of delay elements includes a multiplexer configured to receive the at least one polarity encoded clocking signal.

7. The circuit of claim 6, wherein the multiplexer is configured to receive a half rate even signal and a half rate odd signal.

8. The circuit of claim 7, wherein the multiplexer is configured to generate a full rate output signal responsive to the half rate even signal, the half rate odd signal, and the at least one polarity encoded clocking signal.

9. The circuit of claim 7, wherein the multiplexer is configured to generate the full rate output signal responsive to the at least one polarity encoded clocking signal and a complement of the half rate even signal and a complement of the half rate odd signal.

10. The circuit of claim 1, wherein a polarity of each of the plurality of delay elements is configured to be controlled by the at least one polarity encoded clocking signal.

11. A multiplexer in a decision feedback equalization circuit, comprising:
   at least one first input configured to receive at least one polarity encoded clocking signal encoded with information about whether or not a delay element uses inverted input data;
   a second set of inputs configured to receive a half rate even signal;
   a third set of inputs configured to receive a half rate odd signal;
   a first set of outputs configured to be responsive to the at least one first input, the second set of inputs, and the third set of inputs.

12. The multiplexer of claim 11, wherein the multiplexer is implemented in current mode logic.

13. The multiplexer of claim 11, wherein the first set of outputs are complements of the second set of inputs and the third set of inputs are responsive to a first state of the at least one first input.

14. The multiplexer of claim 11, wherein the at least one polarity encoded clocking signal is configured to be responsive to a first polarity control signal.

15. The multiplexer of claim 14, wherein at least one of the at least one polarity encoded clocking signal is disabled responsive to the first polarity control signal.

16. The multiplexer of claim 14, wherein at least one of the at least one polarity encoded clocking signal is enabled responsive to the first polarity control signal.

17. A delay element in a decision feedback equalization circuit, comprising:
   a first set of inputs configured to receive at least one polarity encoded clocking signal encoded with information about whether or not the delay element uses inverted input data;
   a second set of inputs configured to receive a version of an error signal, wherein the delay element is configured to generate a half rate even signal responsive to the version of the error signal and generate a half rate odd signal responsive to the version of the error signal;
   a first set of outputs configured to be responsive to the received version of the error signal and the first set of inputs.

18. The delay element of claim 17, wherein the delay element is implemented in current mode logic.

19. The delay element of claim 17, wherein the first set of outputs are complements of the received version of the error signal.

20. The delay element of claim 17, wherein the at least one polarity encoded clocking signal is configured to be responsive to a first polarity control signal.

21. The delay element of claim 20, wherein at least one of the at least one polarity encoded clocking signal is disabled responsive to the first polarity control signal.

22. The delay element of claim 20, wherein at least one of the at least one polarity encoded clocking signal is enabled responsive to the first polarity control signal.

* * * * *